(12) United States Patent
Lin

(10) Patent No.: US 8,498,508 B2
(45) Date of Patent: Jul. 30, 2013

(54) OPTICAL FIBER CONNECTOR

(75) Inventor: I-Thun Lin, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 398 days.

(21) Appl. No.: 12/748,457

(22) Filed: Mar. 29, 2010

(65) Prior Publication Data

US 2011/0097038 A1 Apr. 28, 2011

(30) Foreign Application Priority Data

Oct. 27, 2009 (CN) .......................... 2009 1 0308867

(51) Int. Cl.
*G02B 6/26* (2006.01)

(52) U.S. Cl.
USPC ................................. 385/43; 439/9

(58) Field of Classification Search
USPC ............... 385/43, 53–56, 58–63, 68, 70–75, 385/92–93; 439/9
See application file for complete search history.

(56) References Cited

U.S. PATENT DOCUMENTS

| | | | | |
|---|---|---|---|---|
| 4,830,456 A | * | 5/1989 | Kakii et al. | 385/75 |
| 4,998,796 A | * | 3/1991 | Bonanni et al. | 385/83 |
| 6,485,315 B1 | * | 11/2002 | Hwang | 439/108 |
| 2002/0186932 A1 | * | 12/2002 | Barnes et al. | 385/78 |
| 2009/0214165 A1 | * | 8/2009 | Shimotsu et al. | 385/79 |

FOREIGN PATENT DOCUMENTS

| | | | |
|---|---|---|---|
| JP | 05313041 A | * | 11/1993 |
| JP | 2001116955 A | | 4/2001 |
| JP | 2002169061 A | * | 6/2002 |

* cited by examiner

*Primary Examiner* — Charlie Peng
*Assistant Examiner* — Peter Radkowski
(74) *Attorney, Agent, or Firm* — Altis Law Group, Inc.

(57) ABSTRACT

An optical fiber connector is disclosed. The optical fiber connector includes a housing, a coupler and an resilient member received in the housing. The coupler received in the housing and couples optical signals between optical fibers. The coupler includes a main portion and a flat positioning portion integrally connected to the main portion. The resilient member includes a first arm and a second arm forming a subtantially V-shaped profile, an inner surface of the resilient member is flat. The positioning portion is inserted between the V-shaped profile resilient member, and the distal end of the positioning portion is in contact to the resilient member. The resilient member is configured to apply a spring force on the coupler.

18 Claims, 3 Drawing Sheets

OPTICAL FIBER CONNECTOR

BACKGROUND

1. Technical Field

The present disclosure relates to connectors, particularly, an optical fiber connector with coupling mechanism.

2. Description of Related Art

An optical fiber connector is used to couple optical fibers. The optical fiber connector typically includes a housing and a coupler received in the housing. One end of the coupler is connected to a number of optical fibers; the other end of the coupler is connected to transmitting lenses each aligned with a corresponding optical fiber. When in use, two optical fiber connectors are connected to each other to couple the optical signals between two optical fibers using the lenses. The couplers of the connectors are in contact with each other, and the optical signals can be transmitted from one to another optical fiber. The optical fiber connector further includes an resilient member (typically, a helical spring) employed to enhance contact and stabilize the coupler.

One end of the helical spring adjoins the inner surface of the housing while the other end adjoins an end of the coupler connecting to the optical fiber. However, when two optical fiber connectors are connected, if the force acting on the optical fiber connectors is asymmetric, the coupler may be tilted relative to the corresponding housing.

What is needed therefore, is a optical fiber connector addressing the above-mentioned problems.

BRIEF DESCRIPTION OF THE DRAWINGS

The components of the drawings are not necessarily drawn to scale, the emphasis instead being placed upon clearly illustrating the principles of the embodiments of the optical fiber connector. Moreover, in the drawings, like reference numerals designate corresponding parts throughout several views.

DETAILED DESCRIPTION

Figure 1:
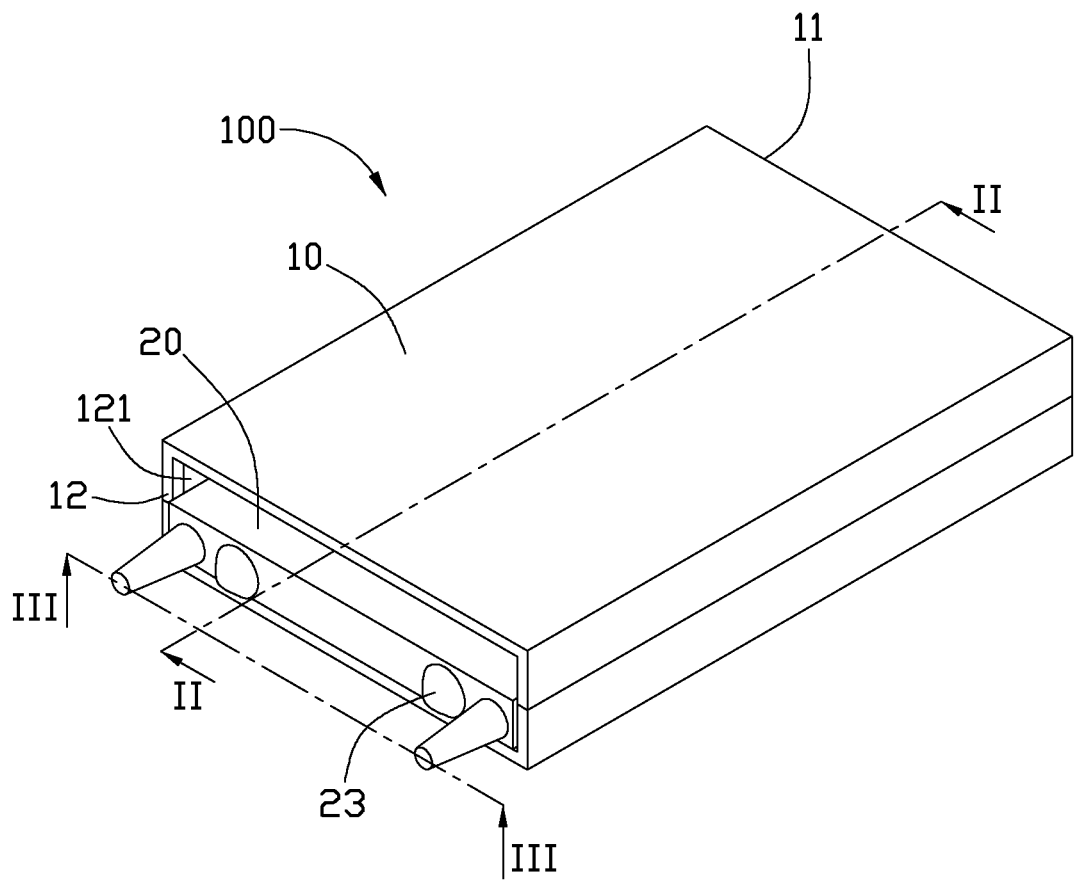
FIG. 1 is an isometric view of an optical fiber connector, according to an exemplary embodiment of the present disclosure.
Figure 2:
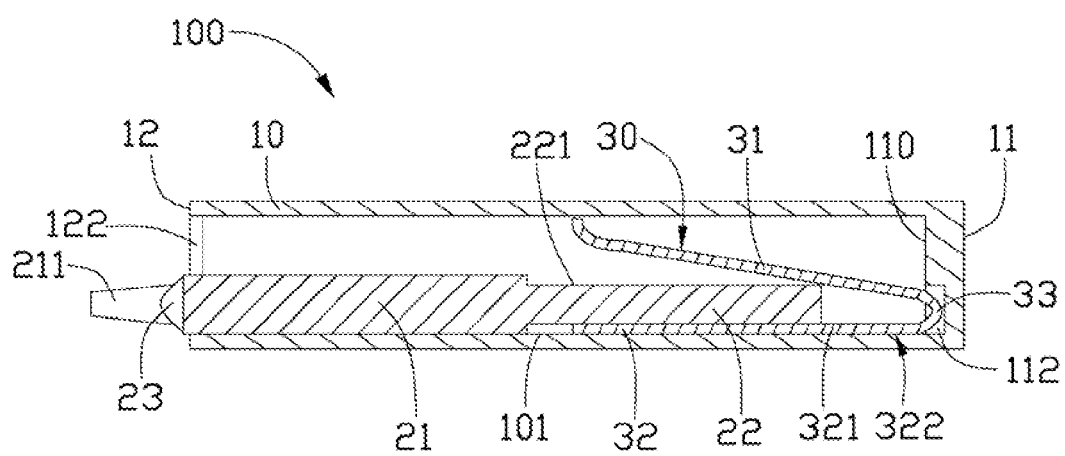
FIG. 2 is a sectional view taken along line II-II of the optical fiber connector of FIG. 1.
Figure 3:
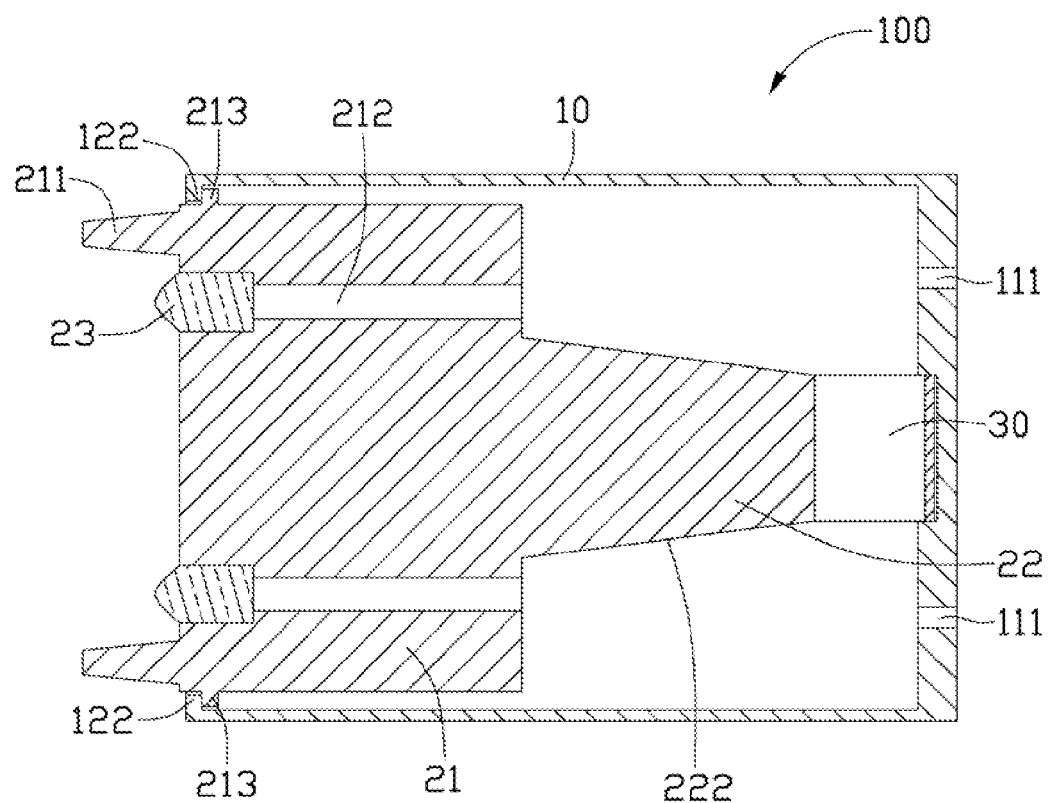
FIG. 3 is a sectional view taken along line of the optical fiber connector of FIG. 1.

Referring to FIGS. 1-3, an optical fiber connector 100, according to an exemplary embodiment, is shown. The optical fiber connector 100 includes a housing 10, a coupler 20 and an resilient member 30. The coupler 20 is partially received in the housing 10, and the resilient member 30 is received in the housing 10 and elastically abuts the coupler 10.

The housing 10 is substantially rectangular and hollow. The housing 10 includes a first end 11 and a second end 12 at opposite sides of the housing 10. An end surface of the first end 11 defines two through holes 111 (see FIG. 3). Each through hole 111 is configured to allow an optical fiber (not shown) to pass therethrough. An end surface of the second end 12 defines an opening 121, the opening 121 is configured for allowing the coupler 20 to passing therethrough. The housing 10 further includes two first blocks 122 formed on opposite sides of the opening 121 of the second end 12.

The coupler 20 includes a main portion 21 and a positioning portion 22 integrally connected to the main portion 21. The main portion 21 is near the opening 121, and the positioning portion 22 is farther from the opening 121. The main portion 21 includes a number of connecting rods 211 protruding from the opening 121. The connecting rods 211 are configured to be connected to a complementary optical fiber connector (not shown). In this embodiment, the number of the connecting rods 211 is two. The main portion 21 defines two fixing holes 212 aligned with the respective through holes 111. The main portion 21 includes two second blocks 213 formed on opposite side surfaces of the main portion 21 corresponding to the first blocks 122. Each second block 213 is engaged with a corresponding first block 122. The coupler 20 includes two converging lenses 23. Each converging lens 23 is fixedly received in a corresponding fixing hole 212. The converging lens 23 transmits optical signals from one optical fiber to another optical fiber. Shape of the positioning portion 22 is substantially a flat portion, and a distal end surface of the positioning portion 22 is substantially parallel to the end surface of the first end 11 of the housing 10. The positioning portion 22 prevents the main portion 21 from tilting relative to the housing 10.

The resilient member 30 is substantially V-shaped profile and includes a first arm 31, a second arm 32, and a curved portion 33. The curved portion 33 connects the first arm 31 and the second arm 32. The curved portion 33 is fixed on an inner surface 110 of the first end 11 of the housing 10. The inner surface 110 of the first end 11 of the housing 10 defines a recess 112 for receiving the curve portion 33 Distal ends of the first arm 31 and the second arm 32 extend toward the second end 12 of the housing 10 from the curved portion 33. A distal end of the positioning portion 22 is inserted between the first arm 31 and the second arm 32. The second arm 32 includes a flat inner surface 321 and a flat out surface 322. The positioning portion 22 includes two opposite flat outer surfaces 221 and a pair of side surfaces 222. The positioning portion 22 tapers from the main portion 21 to a distal end of the positioning portion 22 along the side surfaces 222. One of the flat outer surfaces 221 of the positioning portion 22 is completely in contact with the flat inner surface 321 of the second arm 32. The flat outer surface 322 of the second arm 32 is completely in contact with a flat inner surface 101 of the housing 10. The resilient member 30 provides an elastic force on the positioning portion 22 for stabilizing the coupler 20. Because the distal end of the positioning portion 22 and the inner surfaces of the first arm 31 and the second arm 32 are flat, the positioning portion 22 can be symmetrically in contact with the resilient member 30 thereby preventing the tilting of the coupler 20.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical fiber connector, comprising:
 a housing;
 a coupler received in the housing and configured to couple optical signals between optical fibers; and
 an resilient member received in the housing;
 wherein the coupler comprises a main portion and a flat positioning portion integrally connected to the main portion, the resilient member comprises a first arm and a second arm forming a substantially V-shaped profile, an inner surface of the resilient member is flat, the positioning portion is inserted between the first arm and the second arm of the resilient member, and a distal end of the positioning portion is in contact with the resilient member, the resilient member is configured to apply a spring force on the coupler;

wherein the housing comprises a first end and a second end opposite to the first end, the resilient member comprises a curved portion, the curved portion directly connects the first arm and the second arm, the curved portion is fixed on an inner surface of the first end of the housing, distal ends of the first arm and the second arm extend toward the second end of the housing from the curved portion.

2. The optical fiber connector of claim 1, wherein the housing is substantially rectangular.

3. The optical fiber connector of claim 2, wherein an end surface of the first end defines two through holes to allow optical fibers to pass therethrough, an end surface of the second end defines an opening for allowing the coupler to pass therethrough, the main portion is adjacent to the opening, and the positioning portion is distal from the opening.

4. The optical fiber connector of claim 3, wherein the housing comprises two first blocks formed on opposite sides of the opening, the main portion comprises two second blocks formed on opposite side surfaces of the main portion corresponding to the first blocks, each second block is engaged with a corresponding first block.

5. The optical fiber connector of claim 3, wherein the main portion defines two fixing holes aligned with the respective through holes.

6. The optical fiber connector of claim 5, wherein the coupler comprises two converging lenses each fixedly received in a corresponding fixing hole.

7. The optical fiber connector of claim 1, wherein the main portion comprises a plurality of connecting rods protruding from the opening configured for connecting to a complementary optical fiber connector.

8. The optical fiber connector of claim 1, wherein the inner surface of the first end of the housing defines a recess, the recess receives the curve portion therein.

9. The optical fiber connector of claim 1, wherein the positioning portion comprises a pair of side surfaces, the positioning portion tapers from the main portion to the distal end of the positioning portion along the side surfaces.

10. The optical fiber connector of claim 1, wherein the second arm comprises a flat inner surface, the positioning portion comprise two opposite flat outer surfaces, one of the flat outer surfaces of the positioning portion is completely in contact with the flat inner surface of the second arm.

11. An optical fiber connector, comprising:
a housing;
a coupler received in the housing and configured to couple optical signals between optical fibers; and
an resilient member received in the housing;
wherein the coupler comprises a main portion and a flat positioning portion integrally connected to the main portion, the resilient member comprises a first arm and a second arm forming a substantially V-shaped profile, the positioning portion is inserted between the first arm and the second arm of the resilient member, and a distal end of the positioning portion is in contact with the resilient member, the resilient member is configured to apply a spring force on the coupler, the second arm comprises a flat outer surface, the flat outer surface of the second arm is completely in contact with a flat inner surface of the housing, the resilient member comprises a curved portion, and the curved portion is fixed on an inner surface of the first end of the housing.

12. The optical fiber connector of claim 11, wherein the housing is substantially rectangular, and the housing comprises a first end and a second end at opposite sides of the housing.

13. The optical fiber connector of claim 12, wherein an end surface of the first end defines two through holes to allow optical fibers to pass therethrough, an end surface of the second end defines an opening for allowing the coupler to pass therethrough, the main portion is adjacent to the opening, and the positioning portion is distal from the opening.

14. The optical fiber connector of claim 13, wherein the housing comprises two first blocks formed on opposite sides of the opening, the main portion comprises two second blocks formed on opposite side surfaces of the main portion corresponding to the first blocks, and each second block is engaged with a corresponding first block.

15. The optical fiber connector of claim 12, wherein the curved portion directly connects the first arm and the second arm, distal ends of the first arm and the second arm extend toward the second end of the housing from the curved portion.

16. The optical fiber connector of claim 15, wherein the inner surface of the first end of the housing defines a recess, and the recess receives the curve portion therein.

17. The optical fiber connector of claim 11, wherein the positioning portion comprise a pair of side surfaces, the positioning portion tapers from the main portion to the distal end of the positioning portion along the side surfaces.

18. The optical fiber connector of claim 11, wherein the second arm comprises a flat inner surface, the positioning portion comprise two opposite flat outer surfaces, one of the flat outer surfaces of the positioning portion is completely in contact with the flat inner surface of the second arm.

* * * * *